United States Patent [19]
Hartwig et al.

[11] Patent Number: 5,177,335
[45] Date of Patent: Jan. 5, 1993

[54] PREFILTER FOR EDM MACHINE

[75] Inventors: John D. Hartwig, St. Louis; Roy W. Ritchey, Jr., Eureka, both of Mo.

[73] Assignee: Westhoff Machine Company, Fenton, Mo.

[21] Appl. No.: 465,507

[22] Filed: Jan. 16, 1990

[51] Int. Cl.⁵ .............................. B23H 1/10
[52] U.S. Cl. ........................ 219/69.14; 210/122; 210/400
[58] Field of Search .............. 210/400, 122; 219/69.15, 69.14

[56] References Cited

U.S. PATENT DOCUMENTS

| | | | |
|---|---|---|---|
| 794,631 | 7/1905 | Milne | 210/387 |
| 2,664,203 | 12/1953 | Crane et al. | 210/387 |
| 2,665,812 | 1/1954 | Crane | 210/387 |
| 2,765,394 | 10/1956 | Griffith | 219/69.15 |
| 4,754,115 | 6/1988 | Rhoades | 219/69.15 |

FOREIGN PATENT DOCUMENTS

| | | | |
|---|---|---|---|
| 1114462 | 5/1968 | United Kingdom | 210/387 |
| 1146170 | 3/1969 | United Kingdom | 210/387 |

*Primary Examiner*—Bernard Nozick
*Attorney, Agent, or Firm*—Rogers, Howell & Hafferkamp

[57] ABSTRACT

A prefilter for an EDM machine includes a tank for holding flush water with guide rollers and channels used to thread a continuous sheet of filter paper along the bottom thereof such that the flush water is prefiltered by the continuous sheet filter paper. A float switch detects the level of flush water in the tank so that as the filter paper becomes clogged, it actuates a take-up motor for advancing the filter paper through the tank to remove clogged filter paper therefrom and replace it with fresh filter paper. The prefilter may be used as a kit for retrofit to existing EDM machines or provided as part of an original equipment design.

14 Claims, 2 Drawing Sheets

PREFILTER FOR EDM MACHINE

BACKGROUND AND SUMMARY OF THE INVENTION

This invention relates to a prefilter both in the form of a kit for retrofit as well as part of the original construction for an electrical discharge machining (EDM) machine. EDM is a process in which a conductive electrode is charged with electricity and brought into contact with a workpiece to thereby electrically erode away the unwanted portion thereof. Typically, a thin wire (from 0.002 inches to 0.014 inches diameter) is used as the electrode and is thus capable of precision machining. EDM is a very precise and complicated machining process that is typically controlled by an on-board computer.

All wire EDM machines come standard with a cartridge-type filter system for filtering the water used to flush the swarf or waste from the workpiece as it is burned away. Proper flushing of the workpiece is critical in attaining the high degree of accuracy and reliability required for most EDM operations. The standard cartridge filter on most wire EDM machines can be relatively expensive and, under heavy machining conditions, require replacement on a relatively frequent basis. This not only becomes expensive due to the cost for the replacement filter elements, but also from machine down time as it can take from one to two hours to change out a filter element for a typical EDM machine. Several examples of primary filter systems as might be used on an EDM machine include U.S. Pat. Nos. 3,757,949; 2,664,203; and 2,665,812; the disclosures of which are incorporated herein by reference.

In order to minimize the expense and down time normally associated with the primary filter systems for EDM machines in the prior art, the inventors herein have succeeded in developing a prefilter which can be utilized as a kit to retrofit existing EDM machines and which can be incorporated into the design of new EDM machines. Essentially, the prefilter of the present invention includes a tank with a plurality of holes along its bottom, with a mounting bracket for holding a roll of continuous, sheet-type filter paper, channels on opposite sides of the bottom of the tank through which the filter paper is threaded to a take-up roll mounted opposite the filter paper roll, and a float switch in the tank for sensing the level of water in the tank and actuating a motor operatively coupled to the take-up roll for advancing the filter paper through the tank. The tank is designed to fit over the top of the water tank of an EDM machine and under the return water line such that the flush water which contains machine residue fills the prefilter tank and is processed therethrough prior to being filtered by the primary filter of the EDM machine.

The prefilter design of the present invention is elegantly simple and makes efficient use of relatively inexpensive continuous sheet-type filter paper in order to prefilter the swarf from the flush water. In operation, as the flush water fills the tank, it filters through the filter paper and exits the tank through the series of holes along the tank bottom. As the filter paper becomes clogged with swarf, the water flow rate decreases such that the level of the water in the tank increases. Once the water level reaches a pre-determined point, the float switch operates which actuates the motor on the take-up roll to advance the filter paper along the bottom of the tank. This increases water flow through the filter paper as dirty filter paper is advanced out of the bottom of the tank while clean filter paper is advanced into the bottom of the tank, clean filter paper obviously having a greater flow rate than dirty filter paper. As the water flow rate through the filter paper increases, the tank level decreases and the float switch turns off the motor to stop further movement of the filter paper through the tank. This process is repeated as the new filter paper becomes clogged as well. The inventors have found that in a typical installation, the float switch remains on for approximately three seconds and the filter paper moves an average of one inch for each cycle. The float switch may cycle as much as once every five minutes to an hour, depending upon the duty cycle for the EDM machine.

While the principal advantages and features of the invention have been explained above, a more detailed explanation follows in the drawings and description of the preferred embodiment.

DETAILED DESCRIPTION OF THE PREFERRED EMBODIMENT

Figure 1:
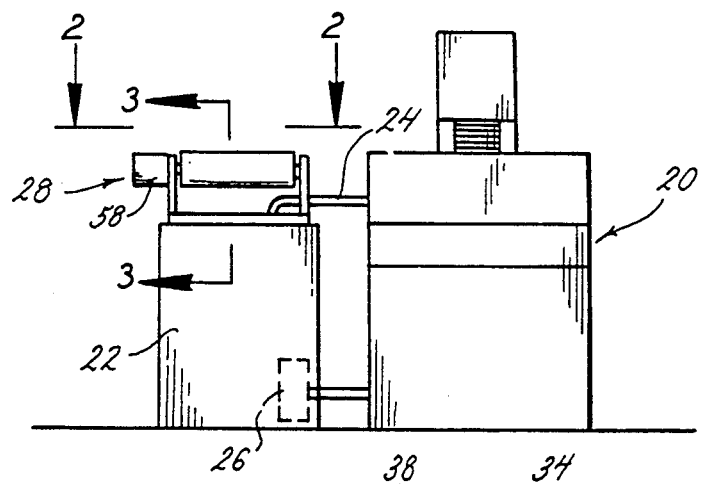
FIG. 1 is a side view of a typical EDM machine with the prefilter of the present invention shown installed on the water tank thereof.

As shown in FIG. 1, an EDM machine 20 includes a water tank 22 which receives flush water from a water pipe 24 which is filtered by filter 26 before being recirculated to the EDM machine 20 for flushing swarf or machine residue from a workpiece as it is milled. The prefilter 28 of the present invention is shown mounted atop the water tank 22 of the EDM machine such that flush water from water pipe 24 flows into the prefilter 28 prior to flowing into water tank 22.

Figure 2:
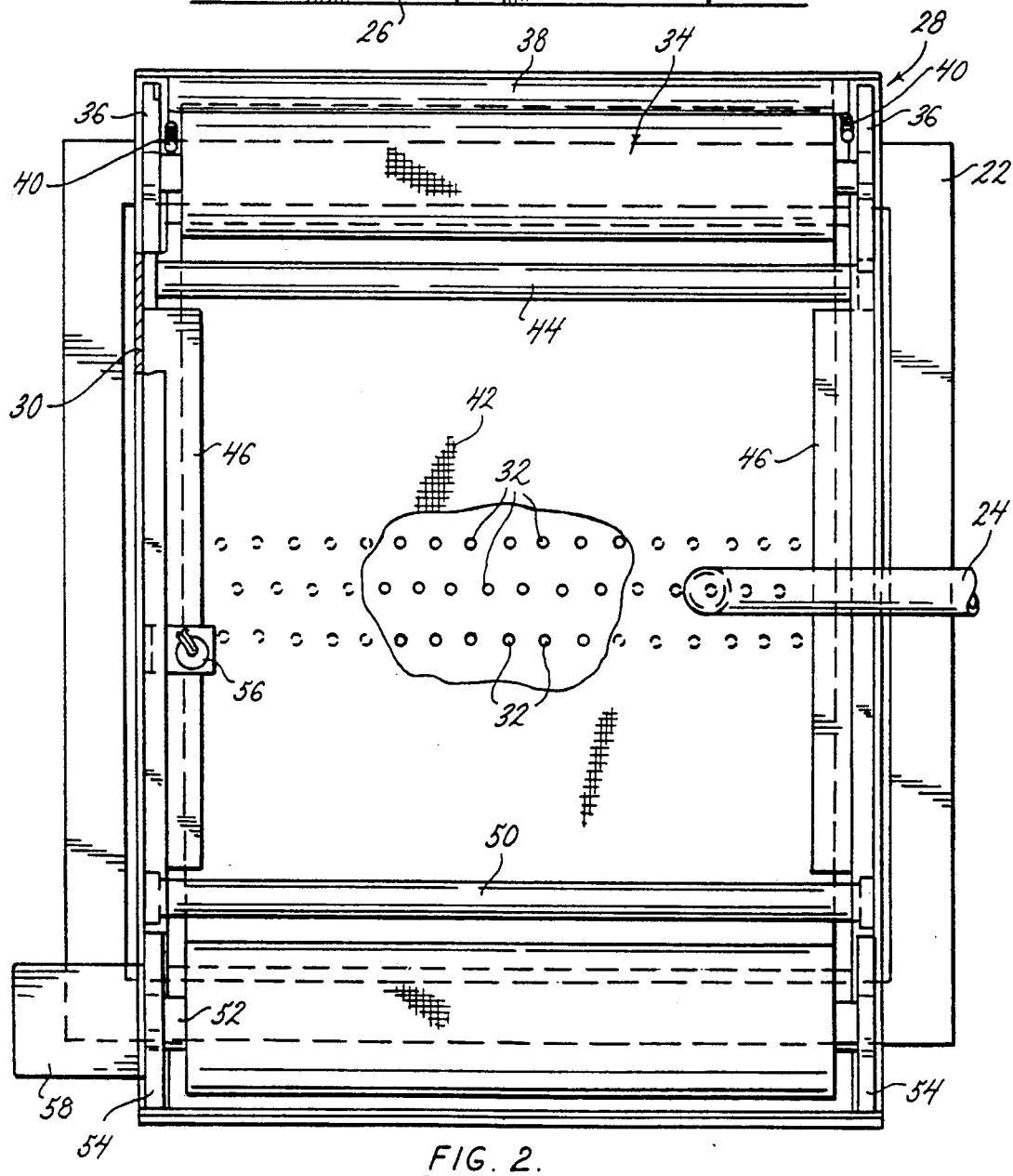
FIG. 2 is a top view of the prefilter taken along the plane of line 2—2 in FIG. 1.
Figure 3:
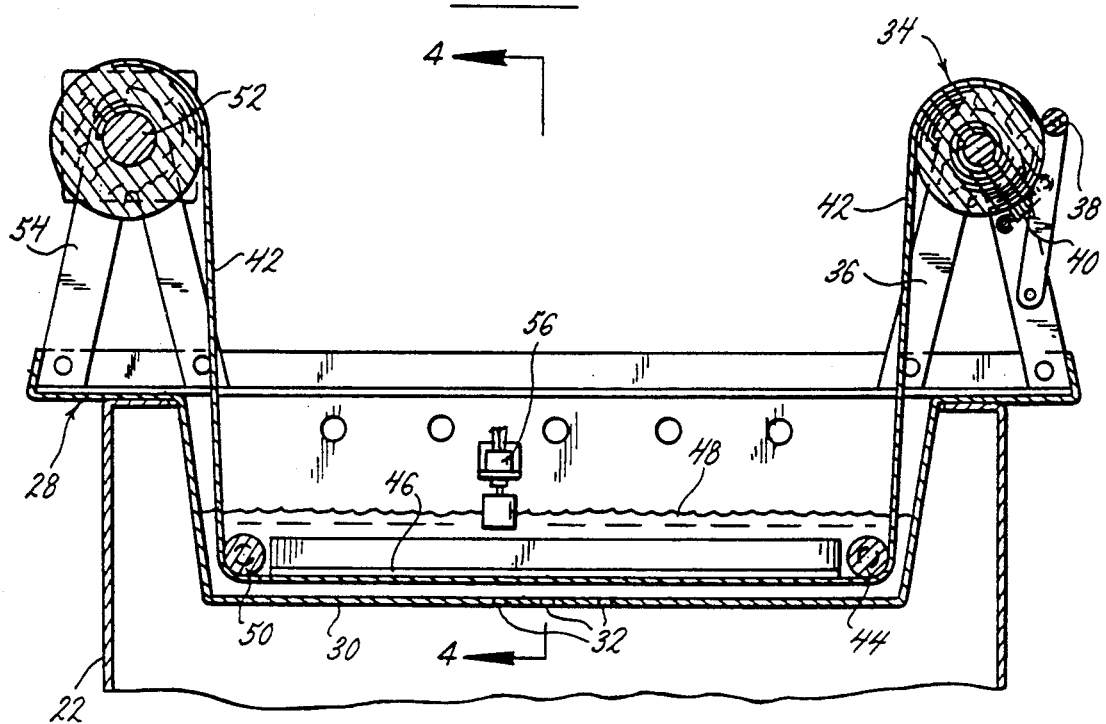
FIG. 3 is a cross-sectional view of the prefilter taken along the plane of line 3—3 in FIG. 1.
Figure 4:
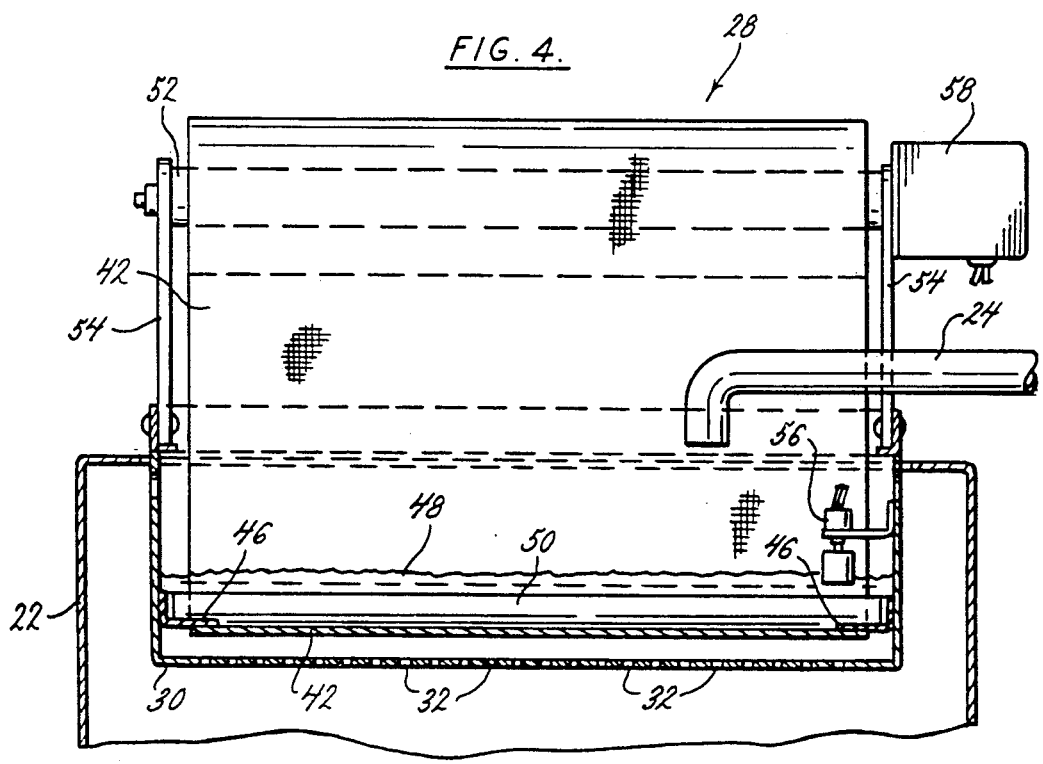
FIG. 4 is a cross-sectional view of the prefilter taken along the plane of line 4—4 in FIG. 3.

As shown in FIGS. 2-4, the prefilter 28 of the present invention includes a tank 30 with a series of holes 32 along the bottom thereof through which the water eventually flows into the water tank 22. A roll of unused filter paper 34 is mounted at one end of tank 30 by a pair of upstanding bracket members 36 with a tension arm and roller 38 with spring 40 for maintaining a tension on filter paper 42 as it unrolls from the roll 34. The filter paper 42 extends downwardly into the tank and wraps around a first guide roller 44 and then extends along the bottom on the tank 30 through a pair of channels 46 mounted on opposite sides of the bottom of the tank. Channels 46 help to hold the filter paper 42 snugly to the bottom of the tank 30 to ensure that substantially all of the flush water 48 is filtered thereby. A second guide roller 50 at the other end of the tank guides the filter paper up to a take-up roll 52 which is mounted at the other end of tank 30 from the filter paper roll 34 by a pair of upstanding end brackets 54. A float switch 56 is mounted to and extends through the side of the tank 30 and detects when the flush water 48 rises to a pre-determined level in tank 30. Float switch 56 is operatively connected to a take-up motor 58 which slowly rotates take-up roll 52 as it is actuated.

In operation, flush water 48 exits from water pipe 24 to fill tank 30. Filter paper 42 is threaded around guide rollers 44, 50 and through channels 46 such that it is maintained in close physical relation to the bottom of the tank 30. Filter paper 42 is wound around take-up roll 52. Flush water 48 is thus filtered by filter paper 42 as the water flows therethrough and out of tank 30 by way of holes 32 and into the water tank 22 of the EDM machine 20. As the filter paper 42 becomes clogged with swarf or machine residue, the water level 48 increases in tank 30 which actuates float switch 56 to turn on take-up motor 58 which rotates take-up roll 52 to wind filter paper 42 thereabout and thereby advance clean paper filter 42 into the tank 30. Of course, as new filter paper 42 replaces clogged filter paper in the bottom of the tank, the flow of flush water 48 increases to thereby lower the level in the tank and turn off float switch 56 which turns off take-up motor 58 to stop further advance of the filter paper. This start-stop operation continues as needed, dependent upon the duty cycle of the EDM machine 20.

As is clearly shown in the drawings and explained herein, the prefilter 20 of the present invention is conveniently mounted atop an existing water tank in an existing installation of an EDM machine. Alternately, the prefilter of the present invention is also easily adapted to new machine designs such that it can be incorporated in a new EDM machine prior to shipment. By prefiltering the flush water of the EDM machine, the life of the cartridge filter used as the primary filter for the machine can be dramatically increased thereby minimizing the expense of replacement filter cartridges as well as eliminating the one to two hours of down time required to change out the filter cartridge of the primary filter.

There are various changes and modifications which may be made to the invention as would be apparent to those skilled in the art. However, these changes or modifications are included in the teaching of the disclosure, and it is intended that the invention be limited only by the scope of the claims appended hereto.

We claim:

1. A prefilter for removing machining residue entrained in water used to flush an EDM machine having a primary filter so as to extend the life of its primary filter, said prefilter comprising:
   a tank for receiving said water;
   means for supporting a supply of porous filter paper from said tank and for extending said porous filter paper into said tank for capturing said residue from said water;
   means associated with said EDM machine for delivering liquid to be filtered from said EDM machine and into said tank upstream from said filter paper for filtering said water as it passes through said filter paper; and
   means connected to said tank for automatically feeding a clean supply of filter paper to said tank in response to said filter paper becoming clogged with residue.

2. The prefilter of claim 1 wherein said automatic feeding means comprises:
   means mounted to and extending into said tank for sensing a pre-determined water level in the tank as indicative of the filter paper becoming clogged; and
   means connected to the paper supporting means for feeding the clean supply of filter paper in response to said water level sensing means sensing said pre-determined water level.

3. The prefilter of claim 2 wherein said water level sensing means further comprises a float extending into the tank and switch means responsive to said float for actuating the paper feeding means.

4. The prefilter of claim 3 wherein said tank further comprises a housing forming a reservoir having imperforate sidewalls, a perforated bottom, and channels on opposite sides of said housing to guide the filter paper along the bottom of the tank.

5. The prefilter of claim 4 wherein said supply of filter paper comprises a roll of said filter paper, said paper being threaded through the channels and further comprising a take-up roll mounted to the tank around which used filter paper is wrapped, and wherein said paper feeding means further comprises a motor mounted on said tank and operatively connected to the take-up roll and the float switch so that as the water level in the tank rises to the pre-determined level, the float switch is activated to operate the motor and wrap the used filter paper onto the take-up roll and thereby advance the filter paper into the tank.

6. The prefilter of claim 5 wherein the channels extend along substantially the entirety of the bottom of the tank so that the filter paper covers substantially the entirety of the bottom of the tank.

7. The prefilter of claim 6 further comprising a guide roller situated at each end of the tank adjacent the ends of the channels to guide the filter paper into and out of the channels.

8. The prefilter of claim 7 wherein the filter paper comprises a continuous sheet having a width substantially the same as that of the tank and the distance between the channels.

9. In an EDM machine having a recirculating supply of fluid to entrain machining residue, and a primary filter for removing said machining residue from the fluid, the improvement comprising a prefilter for filtering of said residue prior to introduction of the water into the primary filter to thereby extend the life of the primary filter.

10. The device of claim 9 wherein the prefilter includes a filter medium comprised of a continuous sheet of filter paper and means for intermittently advancing said filter paper through the prefilter as it becomes clogged with said residue.

11. The device of claim 10 wherein the prefilter includes a tank for holding a quantity of fluid, and means for orienting the filter paper in the tank so that the fluid traverses the filter paper.

12. The device of claim 11 further comprising a float switch in the tank to detect when the fluid level reaches a pre-determined level, said float switch being connected to the filter paper advancing means to thereby advance the filter paper in response thereto.

13. The device of claim 12 wherein the tank has holes in its bottom surface through which the fluid exits the tank after traversing the filter paper, and the filter paper orienting means comprises a pair of channels on opposite sides of the tank bottom through which the edges of the filter paper slide, the channels thereby retaining the filter paper in close proximity to the tank bottom as it is advanced by the filter paper advancing means.

14. The device of claim 13 wherein the unused filter paper is wrapped around a roll and further comprising a take-up roll for used filter paper mounted at the opposite side of the tank, and the filter paper advancing means comprises a motor connected to the take-up roll so that as the float switch operates the motor rotates the take-up roll to thereby advance the filter paper through the tank.

* * * * *